US006784895B1

(12) United States Patent
Munshi

(10) Patent No.: US 6,784,895 B1
(45) Date of Patent: Aug. 31, 2004

(54) PROGRAMMABLE MULTIPLE TEXTURE COMBINE CIRCUIT FOR A GRAPHICS PROCESSING SYSTEM AND METHOD FOR USE THEREOF

(75) Inventor: Aaftab Munshi, Los Gatos, CA (US)

(73) Assignee: Micron Technology, Inc., Boise, ID (US)

( * ) Notice: Subject to any disclaimer, the term of this patent is extended or adjusted under 35 U.S.C. 154(b) by 439 days.

(21) Appl. No.: 09/690,905

(22) Filed: Oct. 17, 2000

(51) Int. Cl.[7] .............................................. G06T 11/40
(52) U.S. Cl. ..................... 345/582; 345/581; 345/586; 345/589; 345/552
(58) Field of Search ................................ 345/581, 582, 345/586, 589, 506, 552, 561

(56) References Cited

U.S. PATENT DOCUMENTS

| 5,724,561 A |   | 3/1998 | Tarolli et al. ............... 395/523 |
| 5,740,343 A | * | 4/1998 | Tarolli et al. ............... 345/587 |
| 5,798,767 A |   | 8/1998 | Poole et al. ................ 345/431 |
| 5,822,452 A |   | 10/1998 | Tarolli et al. ............... 382/166 |
| 5,850,208 A |   | 12/1998 | Poole et al. ................ 345/153 |
| 5,870,102 A | * | 2/1999 | Tarolli et al. ............... 345/586 |
| 5,990,903 A |   | 11/1999 | Donovan ..................... 345/432 |
| 6,005,580 A |   | 12/1999 | Donovan ..................... 345/428 |
| 6,005,584 A | * | 12/1999 | Kitamura et al. .......... 345/582 |
| 6,181,352 B1 | * | 1/2001 | Kirk et al. ................... 345/506 |
| 6,259,462 B1 | * | 7/2001 | Gruber et al. .............. 345/561 |
| 6,333,744 B1 | * | 12/2001 | Kirk et al. ................... 345/506 |
| 6,392,655 B1 | * | 5/2002 | Migdal et al. ............. 345/582 |
| 6,628,290 B1 | * | 9/2003 | Kirk et al. ................... 345/506 |

* cited by examiner

Primary Examiner—Matthew Luu
Assistant Examiner—Daniel Chung
(74) Attorney, Agent, or Firm—Dorsey & Whitney LLP

(57) ABSTRACT

The present invention is directed toward a texture combine circuit for generating fragment graphics data for a pixel in a graphics processing system. The texture combine circuit includes at least one texture combine unit and is coupled to receive graphics data, such as a plurality of texture graphics data, and perform user selected graphics combine operations on a set of input data selected from the plurality of texture graphics data to produce the fragment graphics data for the pixel. The texture combine circuit may include several texture combine units in a cascade connection, where each texture combine unit is coupled to receive the plurality of texture graphics data and the resultant output value of the previous texture combine units in the cascade.

54 Claims, 4 Drawing Sheets

PROGRAMMABLE MULTIPLE TEXTURE COMBINE CIRCUIT FOR A GRAPHICS PROCESSING SYSTEM AND METHOD FOR USE THEREOF

TECHNICAL FIELD

The present invention is related generally to the field of computer graphics, and more particularly, a circuit and method for combining graphics data for pixels in a computer graphics processing system.

BACKGROUND OF THE INVENTION

In graphics processing systems, the color value of each pixel of a graphics image displayed on a monitor must be calculated. The calculated color values for the pixels are then converted into information for the monitor to display the calculated color. For rendering realistic computer graphics images on a display, the calculation of color values for the pixels involves many different factors. These factors include the emissive color of the pixel based on any texture maps applied, the alpha value (i.e., opacity) of the applied texture maps, the intensity and direction of incoming light, the diffuse and specular properties of a surface in which the pixel is located, the orientation and direction the surface is facing with respect to the incoming light, and the position of the viewer with respect to the surface. Although this list of factors is not conclusive, it does illustrate the fact that various factors should be considered when calculating a pixel's color value.

To facilitate the processing speed necessary to render graphics images seamlessly for applications such as computer animation, many of the processing and calculating of the various factors that are considered in the pixel's color value calculation are performed in parallel. For example, bilinear interpolation to determine the emissive color value of a pixel may occur in parallel with calculating the diffuse and specular surface properties. Where a pixel's color value is based on multiple texture maps, the emissive color value is the combination of the applied color values from the texture maps. The resulting color value of the pixel is the combination of the calculated emissive color value, and the diffuse and specular properties.

A combination circuit is typically included in a graphics processing system for the purpose of combining the various factors and calculations used in determining a pixel's color value. Such a circuit is a texture mapping unit (TMU) as described in U.S. Pat. No. 5,740,343 to Tarolli et al., issued Apr. 14, 1998. Each TMU receives local color and alpha values ($C_{local}$ and $A_{local}$) from a respective texture memory to be used in calculating a pixel's color value and are connected in series to receive a previous TMU's output color and alpha values ($C_{in}$ and $A_{in}$). The color value output calculated by a TMU is the resultant of a combinational function applied to the two input color values $C_{local}$ and $C_{in}$ and alpha values $A_{local}$ and $A_{in}$. The TMUs may be programmed to perform various combinational functions, such as calculate the product of a color value of a local texture map and its respective alpha (i.e., opacity) and add the resulting product to the color value output by a previous TMU. Thus, since each TMU in the cascade receives as a local color value the color value of one texture map, a number of textures may be applied to a single pixel by calculating the pixel's color value through the chain of TMUs.

Although the texture compositing system described in the Tarolli patent allows multiple textures to be applied to calculate the color value of a pixel, it is limited in that the number of textures that may be used in the pixel's color value calculation is limited to the number of TMUs in the TMU chain. Where it is desirable to apply the color values of a texture map more than once during the pixel's color value calculation, the respective texture map must be stored in the texture memory of more than one TMU, sacrificing a TMU that could be used for a different texture map. Additionally, complex calculations involving multiple textures must pass through multiple TMUs to generate the resultant color value for a pixel. If the number of calculations necessary to generate the resulting color value exceeds the number of TMUs in the TMU chain, the calculation cannot be performed, and an alternative method of producing the pixel's color value must be used. Moreover, the calculation performed by each TMU requires one clock cycle to complete. Where calculations to produce the pixel's color value require calculation through only one TMU, several clock cycles are nevertheless necessary to complete the calculation because the color value must pass through the entire TMU chain, wasting time and computing resources.

Therefore, there is a need for a system and method in a graphics processing system that allows for selectively combining the color values of multiple texture maps and graphics visual characteristics to calculate the color value of a pixel.

SUMMARY OF THE INVENTION

The present invention is directed toward a texture combine circuit in a graphics processing system for generating fragment graphics data for a pixel. The texture combine circuit receives graphics data, such as a plurality of texture graphics data, from a texture interpolation circuit and includes at least one texture combine unit coupled to the output terminals of the texture interpolation circuit to receive the plurality of texture graphics data. The texture combine circuit perform graphics combine operations on a set of input data selected from the plurality of texture graphics data to produce the fragment graphics data for the pixel.

DETAILED DESCRIPTION OF THE INVENTION

Embodiments of the present invention provide a texture combine circuit for a graphics processing system that may be programmed to perform various graphics combine operations on multiple textures to produce fragment graphics data. The texture combine circuit includes texture combine units that receive the multiple texture data and have user programmable functions to carry out the combine operation.

Certain details are set forth below to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 1:
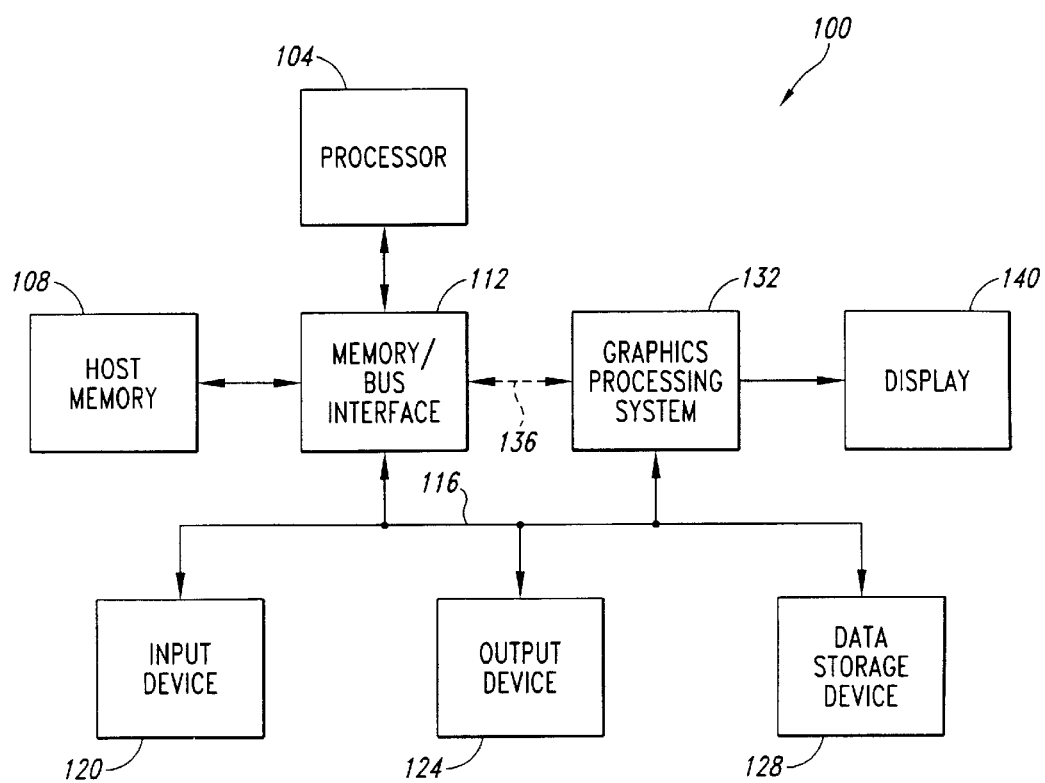
FIG. 1 a block diagram of a computer system in which embodiments of the present invention are implemented.

FIG. 1 illustrates a computer system 100 in which embodiments of the present invention are implemented. The computer system 100 includes a processor 104 coupled to a host memory 108 through a memory/bus interface 112. The memory/bus interface 112 is coupled to an expansion bus 116, such as an industry standard architecture (ISA) bus or a peripheral component interconnect (PCI) bus. The computer system 100 also includes one or more input devices 120, such as a keypad or a mouse, coupled to the processor 104 through the expansion bus 116 and the memory/bus interface 112. The input devices 120 allow an operator or an electronic device to input data to the computer system 100. One or more output devices 120 are coupled to the processor 104 to provide output data generated by the processor 104. The output devices 124 are coupled to the processor 104 through the expansion bus 116 and memory/bus interface 112. Examples of output devices 124 include printers and a sound card driving audio speakers. One or more data storage devices 128 are coupled to the processor 104 through the memory/bus interface 112 and the expansion bus 116 to store data in, or retrieve data from, storage media (not shown). Examples of storage devices 128 and storage media include fixed disk drives, floppy disk drives, tape cassettes and compact-disc read-only memory drives.

The computer system 100 further includes a graphics processing system 132 coupled to the processor 104 through the expansion bus 116 and memory/bus interface 112. Optionally, the graphics processing system 132 may be coupled to the processor 104 and the host memory 108 through other types of architectures. For example, the graphics processing system 132 may be coupled through the memory/bus interface 112 and a high speed bus 136, such as an accelerated graphics port (AGP), to provide the graphics processing system 132 with direct memory access (DMA) to the host memory 108. That is, the high speed bus 136 and memory bus interface 112 allow the graphics processing system 132 to read and write host memory 108 without the intervention of the processor 104. Thus, data may be transferred to, and from, the host memory 108 at transfer rates much greater than over the expansion bus 116. A display 140 is coupled to the graphics processing system 132 to display graphics images. The display 140 may be any type of display, such as a cathode ray tube (CRT), a field emission display (FED), a liquid crystal display (LCD), or the like, which are commonly used for desktop computers, portable computers, and workstation or server applications.

Figure 2:
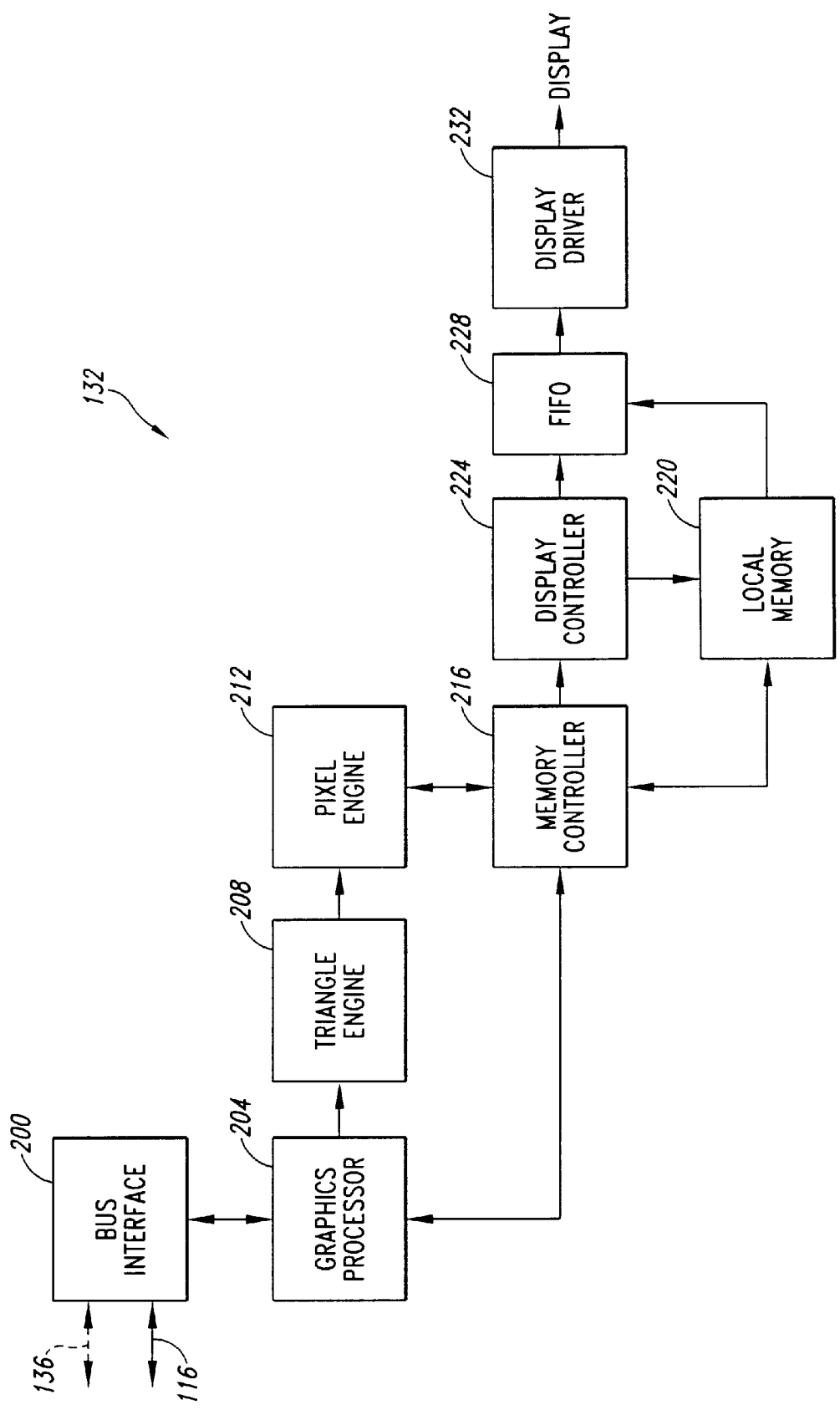
FIG. 2 is a block diagram of a graphics processing system in the computer system of FIG. 1.

FIG. 2 illustrates circuitry included within the graphics processing system 132 for performing various three-dimensional (3D) graphics functions. As shown in FIG. 2, a bus interface 200 couples the graphics processing system 132 to the expansion bus 116. In the case where the graphics processing system 132 is coupled to the processor 104 and the host memory 108 through the high speed data bus 136 and the memory/bus interface 112, the bus interface 200 will include a DMA controller (not shown) to coordinate transfer of data to and from the host memory 108 and the processor 104. A graphics processor 204 is coupled to the bus interface 200 and is designed to perform various graphics and video processing functions, such as, but not limited to, generating vertex data and performing vertex transformations for polygon graphics primitives that are used to model 3D objects. The graphics processor 204 is coupled to a triangle engine 208 that includes circuitry for performing various graphics functions, such as clipping, attribute transformations, rendering of graphics primitives, and generating texture coordinates for a texture map.

A pixel engine 212 is coupled to receive the graphics data generated by the triangle engine 208. The pixel engine 212 contains circuitry for performing various graphics functions, such as, but not limited to, texture application or mapping, bilinear filtering, fog, blending, and color space conversion. Embodiments of the present invention are included in the pixel engine 212. As will be described in more detail below, the pixel engine 212 includes a texture combine circuit having texture combine units that may be programmed to perform various combinatorial functions on a variety of input data, such as color values from multiple texture maps and surface properties of a surface, to calculate a fragment color value for a pixel.

A memory controller 216 coupled to the pixel engine 212 and the graphics processor 204 handles memory requests to and from a local memory 220. The local memory 220 stores graphics data, such as source pixel color values and destination pixel color values. A display controller 224 coupled to the local memory 220 and to a first-in first-out (FIFO) buffer 228 controls the transfer of destination color values to the FIFO 228. Destination color values stored in the FIFO 336 are provided to a display driver 232 that includes circuitry to provide digital color signals, or convert digital color signals to red, green, and blue analog color signals, to drive the display 140 (FIG. 1).

Figure 3:
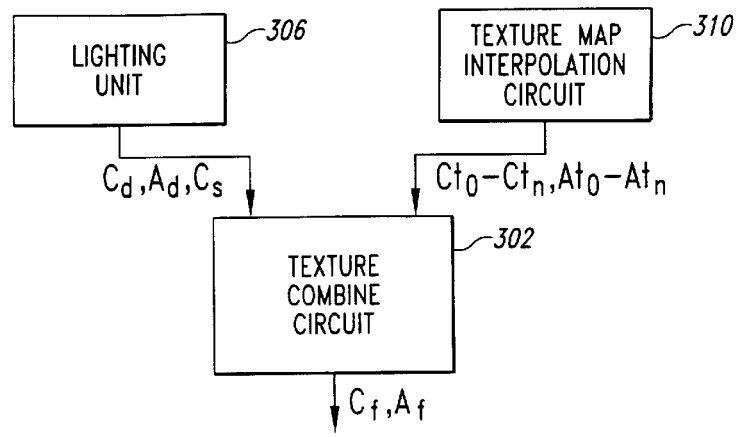
FIG. 3 is a block diagram of a portion of the graphics processing system of FIG. 2.

FIG. 3 illustrates a portion included in the pixel engine 212 (FIG. 2). A texture combine circuit 302 receives data from a lighting unit 306 and a texture map interpolation circuit 310. The lighting unit 306 and the texture map interpolation unit 310 are conventional and are well known by those of ordinary skill in the art. Thus, a detailed description of the lighting unit 306 and the interpolation unit 310 have been omitted in the interests of brevity. The lighting unit 306 provides information describing the surface properties of the surface in which the pixel is located, such as its diffuse colors and alpha, $C_d$ and $A_d$, and specular color $C_s$. The texture map interpolation unit 310 provides color and alpha values for pixels that will be rendered, which are calculated from the color values of a texture map, Ct and At. It will be appreciated that the texture map interpolation circuit 310 may support applying multiple texture maps to a pixel. That is, several color and alpha values, $Ct_0$–$Ct_n$ and $At_0$–$At_n$, corresponding to the texture maps being applied are provided to the texture combine circuit 302 for each pixel. A common interpolation function applied to calculate a pixel's color value is bilinear interpolation. The texture combine circuit 302 generates a pixel's color value from the data provided to it from the texture interpolation circuit 310 and the lighting unit 306. Thus, the resulting color and alpha values for the pixel, the fragment color $C_f$ and fragment alpha $A_f$, accounts for the various lighting characteristics in the graphics image being rendered to create realistic perspective and coloration.

It will be appreciated that the term "color values" as used herein may consist of several color components. For example, the pixel fragment color $C_f$ and the color values of the texture maps Ct may be the combination of red, green, and blue color components. Consequently, although not expressly described herein, a person of ordinary skill in the art will be able to apply the teachings of the present description for colors values having several color components without the need for detailed explanation thereof. The lighting unit 306 and the texture map interpolation circuit 310 may be implemented in conventional manners that are well known to those of ordinary skill in the art. Consequently, a detailed description of these elements has been omitted from herein in the interest of brevity and unnecessarily obscuring the description of embodiments of the present invention.

Figure 4:
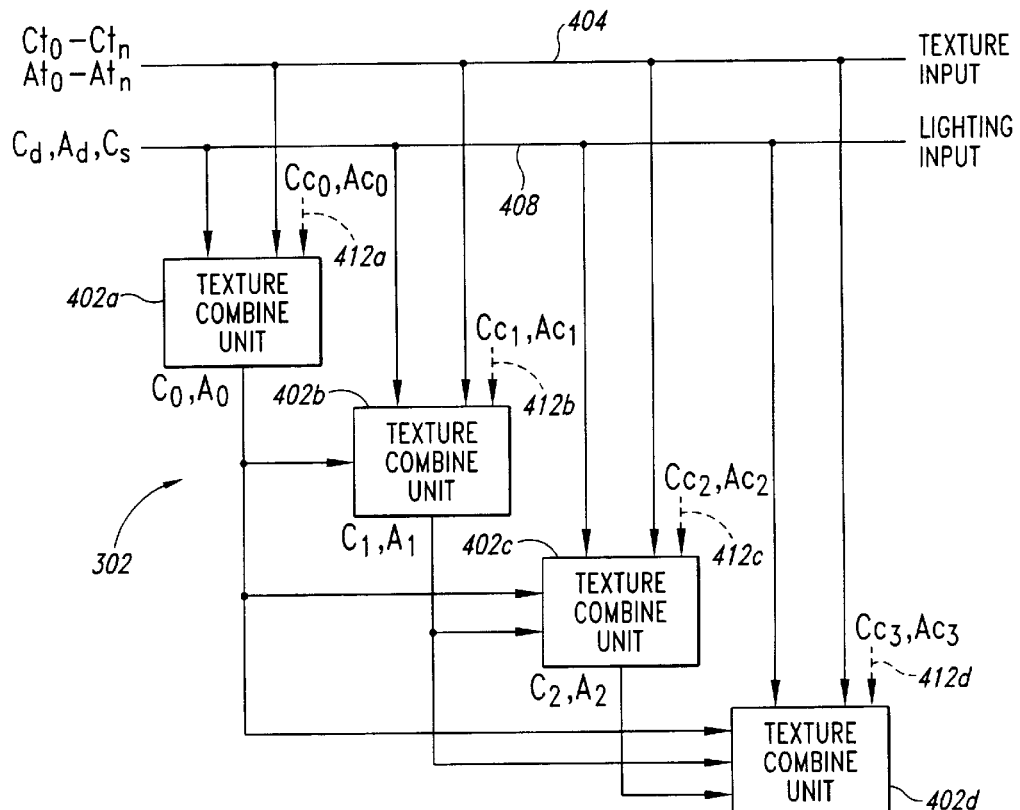
FIG. 4 is a block diagram of the texture combine circuit of FIG. 3 according to an embodiment of the present invention.

Illustrated in FIG. 4 is an embodiment of the texture combine circuit 302. The texture combine circuit 302 includes multiple texture combine units 402a–d coupled in a cascade fashion. Each of the texture combine units 402a–d is coupled to texture color/alpha signal lines 404 to receive any of the color and alpha values $Ct_0$–$Ct_n$ and $At_0$–$At_n$ provided by the texture map interpolation circuit 310 (FIG. 3) and coupled to lighting signal lines 408 to receive the diffuse color $C_d$ and alpha $A_d$, and specular color $C_s$ from the lighting unit 306. That is, the individual texture combine units are not limited to receiving a particular texture color and alpha value, but may be programmed to receive any of the color and alpha values provided from the texture map interpolation circuit 310. Similarly, the data provided by the lighting unit 306 is available for any of the texture combine units 402a–d. Each of the texture combine units 402a–d may also receive an assigned color and alpha value $Cc_0$–$Cc_3$ and $Ac_0$–$Ac_3$. It will be appreciated that many values may be provided and combined by the texture combine units 402a–d. These values, some of which have already been previously described, may include:

$Ct_0$ texture 0 color
$At_0$ texture 0 alpha
$Ct_1$ texture 1 color
$At_1$ texture 1 alpha
$Ct_2$ texture 2 color
$At_2$ texture 2 alpha
$Ct_3$ texture 3 color
$At_3$ texture 3 alpha
$C_s$ iterated specular color
$C_d$ iterated diffuse color
$A_d$ iterated diffuse alpha
$C_{1s}$ specular color output of lighting unit
$A_{1d}$ diffuse alpha output of lighting unit
$C_{1d}$ diffuse color output of lighting unit
F fog factor value
$D_f$ detail factor
$C_0$ output color of combine unit 0
$A_0$ output alpha of combine unit 0
$C_1$ output color of combine unit 1
$A_1$ output alpha of combine unit 1
$C_2$ output color of combine unit 2
$A_2$ output alpha of combine unit 2
$Cc_0$ constant color assigned to combine unit 0
$Ac_0$ constant alpha assigned to combine unit 0
$Cc_1$ constant color assigned to combine unit 1
$Ac_1$ constant alpha assigned to combine unit 1
$Cc_2$ constant color assigned to combine unit 2
$Ac_2$ constant alpha assigned to combine unit 2
$Cc_3$ constant color assigned to combine unit 3
$Ac_3$ constant alpha assigned to combine unit 3

The lighting unit diffuse color $C_{1d}$, alpha $A_{1d}$ and specular color $C_{1s}$ are provided by the lighting unit 306 (FIG. 3).

The texture combine units 402a–d operate in cascaded mode such that the output color and alpha value of each of the texture combine units 402 may be provided to a succeeding texture combine unit further along in the chain. Thus, texture combine units 402 located later in the cascade may be able to use the output of a previous texture combine unit in a color/alpha calculation. The final texture combine unit 402d outputs the fragment pixel color $C_f$ and alpha value $A_f$ for the pixel being rendered.

Figure 5:
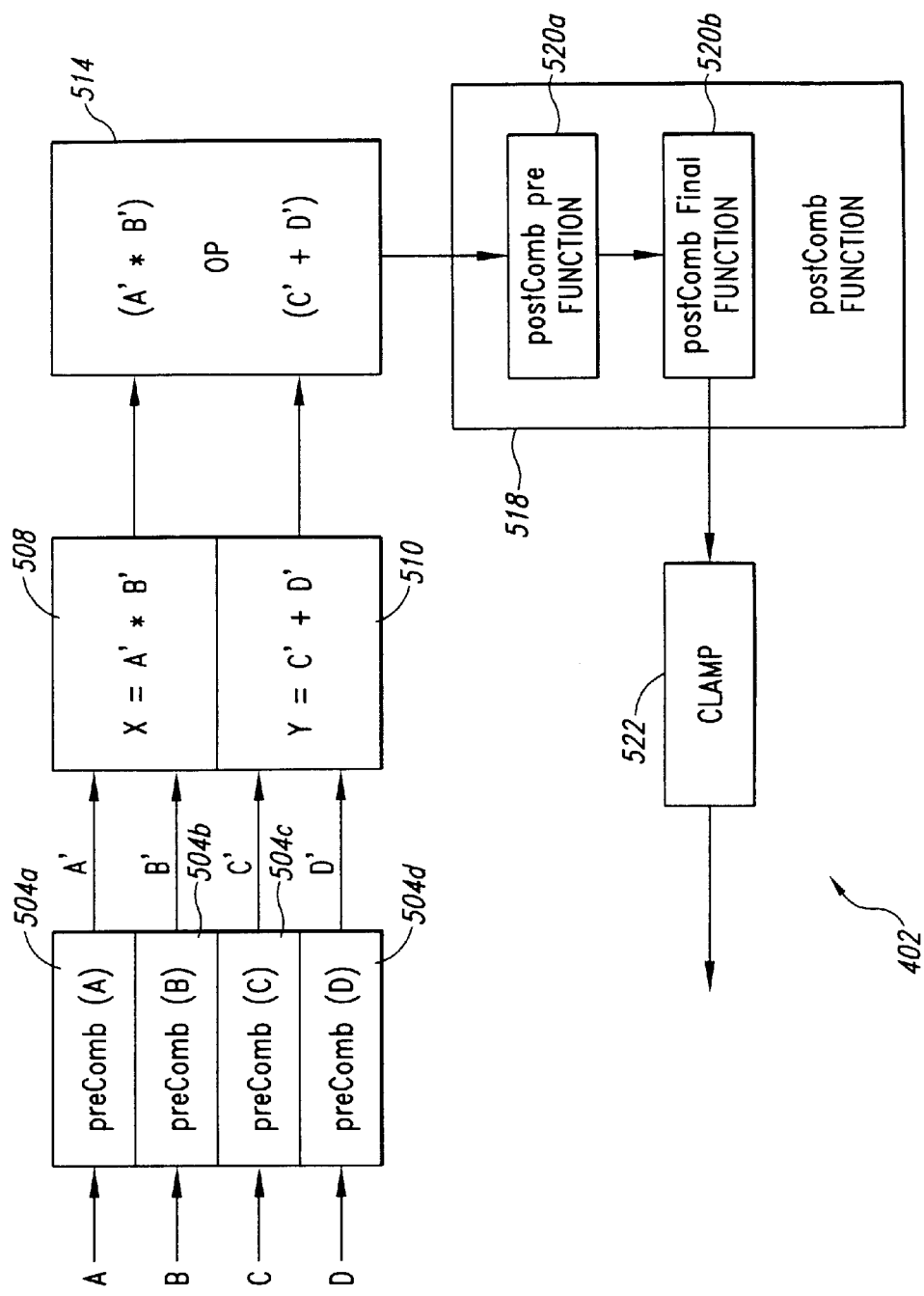
FIG. 5 is a functional block diagram of a texture combine unit included in the texture combine circuit of FIG. 4.

FIG. 5 illustrates the functional block diagram of a texture combine unit 402 included in the texture combine unit 302 (FIG. 4). Each of the texture combine units 402 includes similar functional blocks. Moreover, although the color and alpha components are treated separately in the texture combine units 402, the functional blocks illustrated in FIG. 5 are similar with respect to the color calculation and the alpha calculation. There are differences as to the input data that may be received by the color and alpha combine components, however, the functional description may be applied to both. Consequently, the description of FIG. 5 may be generally applied to each of the texture combine units 402a–d illustrated in FIG. 4 and to calculating both the color and alpha components. Moreover, as mentioned previously, a detailed description of the implementation of the following combine functions and operations has been omitted from herein in order to avoid unnecessarily obscuring the invention. Implementation of the present invention may be carried out using conventional logic and circuitry well known in the art. Consequently, a person of ordinary skill in the art will derive sufficient understanding from the description provided herein to practice the invention.

The texture combine unit 402 is structured to perform a texture combine operation of the following format:

postComb (X op Y), where,

X=[preComb(A)*preComb(B)]; and

Y=[preComb(C)+preComb(D)].

That is, the X and Y values are computed by an x-function 508 and y-function 510 from the output of preComb functions 504a–d. An op-function 514 is then applied to compute (X op Y). The resulting value of the op combine operation 514 is provided to a postComb function 518. As discussed in more detail below, the preComb function 504a–d and the postComb function 518 may be programmed to perform selected operations. After postComb, the colors and alpha values are clamped by clamp function 522 to be a 8-bit unsigned integer.

Examples of input values for A, B, C and D for the texture combine units are:

0,
$Ct_0$, $At_0$, $Ct_1$, $At_1$, $Ct_2$, $At_2$, $Ct_3$, $At_3$,
$C_d$, $A_d$, $C_s$, $C_{1d}$, $A_{1d}$, $C_{1s}$, F,
$C_c$, $A_c$, (selected based on combine unit)
$C_0$, $A_0$, (selected based on combine unit)
$D_f$, Examples of input values for A, B, C and D for the alpha combine unit are:

0,
$At_0$, $At_1$, $At_2$, $At_3$, $A_d$, $A_{1d}$, F,
$A_c$, (selected based on combine unit)
$A_0$ (selected based on combine unit)

The preComb functions 504a–d are performed prior to the input being used as part of the op combine operation 514. In an embodiment of the texture combine unit 402, the preComb functions 504a–d may be, for example:

none, the input is unchanged invert, the input value is inverted to become −input scale and bias, the input is converted from a range of 0 to 255 to a range of −255 to +255. The operation is performed by (2*input −255)

The output of the preComb functions 504a–d are provided to the x-function 508 and the y-function 510 to determine the X and Y values used in the op combine operation 514. In an embodiment of the present invention, the op combine operation 514 may be selected from any of the following (the following operations are also described using C programming notation):

add X+Y subtract X−Y or X|Y and X & Y xor X^Y min calculate min(X, Y)

max calculate max(X, Y)

compareGT performs the following comparison (condTerm>condvalue) ? X:Y compareGE performs the following comparison (condterm>=condValue) ? X:Y compareEQ performs the following comparison (condTerm,==condValue) ? X:Y compareNEQ performs the following comparison (condterm ! =condValue) ? X:Y Both condTerm and condValue are programmed for the color and alpha combine units separately. For the color combine unit, condTerm can be:

0, $At_0$, $At_1$, $At_2$, $At_3$, $A_d$, $A_{1d}$, F, $A_c$, (selected based on combine unit)

$A_0$ (selected based on combine unit)

For the alpha combine unit, condTerm can be:

0, $At_0$, $At_1$, $At_2$, $At_3$, $A_d$, $A_{1d}$, F, $A_c$, (selected based on combine unit)

$A_0$ (selected based on combine unit)

The term condValue is a 8-bit unsigned integer from 0 to 255.

The postComb function 518 is performed following the completion of the op combine operation 514, but prior to the output being provided to the next texture combine unit in the series of texture combine units 402a–d or as the final fragment color/alpha $C_f$ and $A_f$. In one embodiment of the texture combine unit 402, the postComb function 518 may be broken into the following two sub-functions, a postCombPre function 520a and a postCombFinal 520b. The postCombPre and postCombFinal functions may be as follows:

postCombPre none, output remains unchanged subBias, output=output−128 postcombFinal none, output remains unchanged modulate 2x, output<<1 modulate 4x, output<<2 demodulate 2x, output>>1 sum, takes the r, g, and blue components, sums them and replicates them in the r, g, and b components sumall, similar to sum except adds alpha too but replicates the result in the r, g, and b components only sumAndReplicate, similar to sumall but result is replicated in the alpha channel too.

The output of the postComb function 518 is provided to a clamp function 522 to clamp the value to be a 8-bit unsigned integer.

In operation, the texture combine circuit 302 (FIG. 4) may be programmed to perform operations on several input values that would be incapable on conventional texture combine circuits, or require additional steps for the complete calculation. For example, where the color fragment $C_f$ for a pixel models a diffuse lighting effect with respect to a second texture and a texture colored specular effect that is the composite of two available textures, one of which is the texture applied to model the diffuse lighting effect, the pixel's fragment color $C_f$ is:

$$C_f = (Ct_0 * Ct_1) + (Ct_2 + Ct_0)$$

This operation may be completed by the texture combine circuit 302 by programming the texture combine unit 402a as follows:

inputs A, B, C and D are $Ct_0$, $Ct_1$, $Ct_2$ and $Ct_0$, respectively;

the preComb functions 504a–d for A, B, C, and D to be none;

the op function 514 to be add;

the postCombPre function 520a to be none; and the postCombFinal function 520b to be none.

The complete operation described above could be performed by the texture combine 402a and would not need to be iterated through the cascade of texture combine units 402a–d. Unlike the texture combine circuit 302, a conventional texture compositing system, such as the one described in the Tarolli patent mentioned previously, would not be capable of performing the operation because a particular texture is applied more than once in calculating a pixel's fragment color.

From the foregoing it will be appreciated that, although specific embodiments of the invention have been described herein for purposes of illustration, various modifications may be made without deviating from the spirit and scope of the invention. For example, the texture combine circuit 302 has been described as including only four texture combine units 402a–d. However, it will be appreciated that the texture combine circuit 302 may include more or less texture combine units. Accordingly, the invention is not limited except as by the appended claims.

What is claimed is:

1. A texture combine circuit for generating fragment graphics data for a pixel in a graphics processing system, comprising:

a texture interpolation circuit having output terminals to provide a plurality of texture graphics data for the pixel;

a first texture combine unit coupled to the output terminals of the texture interpolation circuit to receive the plurality of texture graphics data for the pixel and perform graphics combine operations on input data selected from the plurality of texture graphics data for the pixel to produce first combined graphics data at first texture combine unit output terminals;

a second texture combine unit coupled to the output terminals of the texture interpolation circuit to receive the plurality of texture graphics data for the pixel and further coupled to the first texture combine unit output terminals to receive the first combined graphics data, the second texture combine unit performing graphics combine operations on the input data selected from the plurality of texture graphics data for the pixel and the first combined graphics data to produce second combined graphics data at second texture combine unit output terminals; and a third texture combine unit coupled to the texture interpolation circuit to receive the plurality of texture graphics data for the pixel and further coupled to the first and second output terminals to perform third graphics combine operations on a third group of data selected from the graphics data from the plurality of textures for the pixel, the first and the second resultant graphics values and provide third resultant graphics values resulting from the third graphics combine operations at third output terminals.

2. The texture combine circuit of claim 1 wherein the texture graphics data and the fragment graphics data for the pixel comprise color values and alpha values.

3. The texture combine circuit of claim 2 wherein the color values comprise red, green, and blue color components.

4. The texture combine circuit of claim 1, further comprising a graphics lighting unit coupled to the at least one texture combine unit to provide lighting graphics data for use in the graphics combine operations and the input data is selected from the plurality of texture graphics data and the lighting graphics data.

5. The texture combine circuit of claim 1 wherein the graphics combine operations performed by the texture combine unit are user programmable.

6. The texture combine circuit of claim 1 wherein the texture combine unit comprises:

a pre-combine circuit to perform first functional operations on the input data and a post pre-combine function on the resultant thereof and produce pre-combine resultant values at pre-combine output terminals;

an operation circuit coupled to the pre-combine output terminals to perform a second functional operation on the pre-combine resultant values and produce an operation resultant value at an operation output terminal; and a post-combine circuit coupled to the operation output terminal to perform a third functional operation on the operation resultant value and produce a post-combine output value at a post-combine output terminal.

7. The texture combine circuit of claim 6, further comprising a clamping circuit coupled to the post-combine output terminal to clamp the post-combine output value to a texture combine output value.

8. The texture combine circuit of claim 6 wherein the first functional operations performed by the pre-combine circuit on the input data are:

the input data is unchanged, the input data is inverted, or the input data converted from a range of 0 to 255 to a range of –255 to +255 by multiplying the input data by two and subtracting 255.

9. The texture combine circuit of claim 6 wherein the resultant values of the first functional operations comprise first, second, third, and fourth values and the pre-combine function performed by the pre-combine circuit to produce the pre-combine resultant values comprises:

first value x second value; and third value+fourth value.

10. The texture combine circuit of claim 6 wherein the pre-combine resultant values comprise first and second pre-combine resultant values, X and Y, respectively, and the second functional operation performed by the operation circuit on the pre-combine resultant values to produce the operation resultant value is:

the sum of X and Y, the difference between X and Y,

X OR Y,

X AND Y,

X XOR Y, determine the minimum of X and Y, determine the maximum of X and Y, if a first value is greater than a second value, the operation resultant value is X, otherwise the operation resultant value is Y, if the first value is greater than or equal the second value, the operation resultant value is X, otherwise the operation resultant value is Y, if the first value is equal to the second value, the operation resultant value is X, otherwise the operation resultant value is Y, or if the first value is not equal to the second value, the operation resultant value is X, otherwise the operation resultant value is Y, the first value selected from the texture graphics data and the second value being an integer between 0 and 255.

11. The texture combine circuit of claim 6 wherein the third functional operations performed by the post-combine circuit on the operation resultant value to produce the post-combine output value comprises a fifth function and a sixth function performing an operation on the resultant of the fifth function, the fifth function is:

the operation resultant value is unchanged, or 128 is subtracted from the operation resultant value; and the sixth function is:

the resultant of the fifth function is unchanged, the resultant of the fifth function is shifted left 1 bit, the resultant of the fifth function is shifted left 2 bits, the resultant of the fifth function is shifted right 1 bit, color components of the fifth function are summed and replicated into the color components,the the color components and alpha of the fifth function are summed and replicated into the color components, or the color components and alpha value of the fifth function are summed and replicated into the color components and alpha value.

12. An apparatus in a graphics processing system for combining graphics data from a plurality of textures for a pixel, comprising:

a first texture combine unit coupled to receive the graphics data from the plurality of textures for the pixel to perform first graphics combine operations on a first group of data selected from the graphics data and provide first resultant graphics values resulting from the first graphics combine operations at first output terminals; and a second texture combine unit coupled to receive the graphics data from the plurality of textures for the pixel and further coupled to the first output terminals to perform second graphics combine operations on a second group of data selected from the graphics data for the pixel and the first resultant graphics values and provide second resultant graphics values resulting from the second graphics combine operations at second output terminals, the first and second texture combine units including a pre-combine circuit having pre-combine output terminals and coupled to receive as input data the graphics data for the pixel to perform first functional operations on the selected data and produce pre-combine resultant values at the pre-combine output terminals, the first functional operations performed by the pre-combine circuit on the input data are:

the input data is unchanged, the input data is inverted, or the input data converted from a range of 0 to 255 to a range of −255 to +255 by multiplying the input data by two and subtracting 255.

13. The apparatus of claim 12 wherein the first and second texture combine units comprise:

an operation circuit having an operation output terminal and coupled to the pre-combine output terminals to perform a second functional operation on the pre-combine resultant values and produce an operation resultant value at the operation output terminal; and a post-combine circuit having a post-combine output terminal and coupled to the operation output terminal to perform a third functional operation on the operation resultant value and produce a post-combine output value at the post-combine output terminal.

14. The apparatus of claim 13, further comprising a clamping circuit coupled to the post-combine output terminal to clamp the post-combine output value to a texture combine output value.

15. The apparatus of claim 12 wherein the first and second graphics combine operations performed by the first and second graphics combine units comprise the operation:

postComb(X op Y), where X=(preComb(A)*preComb(B)) and Y=(preComb(C)+preComb(D)), A, B, C, and D are values of the respective group of selected data, and preComb is the output of the respective pre-combine circuits, and op is:
  the sum of X and Y,
  the difference between X and Y,
  X OR Y,
  X AND Y,
  X XOR Y,
  determine the minimum of X and Y,
  determine the maximum of X and Y,
  if a first value is greater than a second value, the respective resultant graphics value is X, otherwise the respective resultant graphics value is Y,
  if the first value is greater than or equal the second value, the respective resultant graphics value is X, otherwise the respective resultant graphics value is Y,
  if the first value is equal to the second value, the respective resultant graphics value is X, otherwise the respective resultant graphics value is Y, or
  if the first value is not equal to the second value, the respective resultant graphics value is X, otherwise the respective resultant graphics value is Y, the first value selected from the texture graphics data and the second value being an integer between 0 and 255.

16. The apparatus of claim 12, further comprising:

a third texture combine unit coupled to receive the graphics data from the plurality of textures and further coupled to the first and second output terminals to perform third graphics combine operations on a third group of data selected from the graphics data from the plurality of textures, the first and the second resultant graphics values and provide third resultant graphics values resulting from the third graphics combine operations at third output terminals.

17. The apparatus of claim 12 wherein the plurality of textures comprises four different textures.

18. The apparatus of claim 12 wherein the graphics combine operations performed by the first and second texture combine units are user selectable.

19. A graphics processing system, comprising:

a bus interface for coupling to a system bus;

a graphics processor coupled to the bus interface to process graphics data;

address and data busses coupled to the graphics processor to transfer address and graphics data to and from the graphics processor;

display logic coupled to the data bus to drive a display;

a texture interpolation circuit coupled to the address and data busses and having output terminals to provide a plurality of texture graphics data for a pixel; and a texture combine circuit coupled to the graphics processor and the texture interpolation circuit to generate fragment graphics data for the pixel from the plurality of texture graphics data, the texture combine circuit comprising:

a first texture combine unit coupled to the output terminals of the texture interpolation circuit to receive the plurality of texture graphics data for the pixel and perform graphics combine operations on input data selected from the plurality of texture graphics data for the pixel to produce first combined graphics data at first texture combine unit output terminals;

a second texture combine unit coupled to the output terminals of the texture interpolation circuit to receive the plurality of texture graphics data for the pixel and further coupled to the first texture combine unit output terminals to receive the first combined graphics data, the second texture combine unit performing graphics combine operations on the input data selected from the plurality of texture graphics data for the pixel and the first combined graphics data to produce second combined graphics data at second texture combine unit output terminals; and a third texture combine unit coupled to the texture interpolation circuit to receive the plurality of texture graphics data for the pixel and further coupled to the first and second output terminals to perform third graphics combine operations on a third group of data selected from the graphics data from the plurality of textures for the pixel, the first and the second resultant graphics values and provide third resultant graphics values resulting from the third graphics combine operations at third output terminals.

20. The graphics processing system of claim 19 wherein the texture graphics data and the fragment graphics data for the pixel comprise color values and alpha values.

21. The graphics processing system of claim 20 wherein the color values comprise red, green, and blue color components.

22. The graphics processing system of claim 19 further comprising a graphics lighting unit coupled to the address and data busses and the at least one texture combine unit to provide lighting graphics data for use in the graphics combine operations, the input data selected by the texture combine unit is selected from the plurality of texture graphics data and the lighting graphics data.

23. The graphics processing system of claim 19 wherein the graphics combine operations performed by the texture combine unit are user programmable.

24. The graphics processing system of claim 19 wherein the texture combine unit comprises:
 a pre-combine circuit to perform first functional operations on the input data and a post pre-combine function on the resultant thereof and produce pre-combine resultant values at pre-combine output terminals;
 an operation circuit coupled to the pre-combine output terminals to perform a second functional operation on the pre-combine resultant values and produce an operation resultant value at an operation output terminal; and
 a post-combine circuit coupled to the operation output terminal to perform a third functional operation on the operation resultant value and produce a post-combine output value at a post-combine output terminal.

25. The graphics processing system of claim 24, further comprising a clamping circuit coupled to the post-combine output terminal to clamp the post-combine output value to a texture combine output value.

26. The graphics processing system of claim 24 wherein the first functional operations performed by the pre-combine circuit on the input data are:
 the input data is unchanged,
 the input data is inverted, or
 the input data converted from a range of 0 to 255 to a range of −255 to +255 by multiplying the input data by two and subtracting 255.

27. The graphics processing system of claim 24 wherein the resultant values of the first functional operations comprise first, second, third, and fourth values and the pre-combine function performed by the pre-combine circuit to produce the pre-combine resultant values comprises:
 first value×second value; and
 third value+fourth value.

28. The graphics processing system of claim 24 wherein the pre-combine resultant values comprise first and second pre-combine resultant values, X and Y, respectively, and the second functional operation performed by the operation circuit on the pre-combine resultant values to produce the operation resultant value is:
 the sum of X and Y,
 the difference between X and Y,
 X OR Y,
 X AND Y,
 X XOR Y,
 determine the minimum of X and Y,
 determine the maximum of X and Y,
 if a first value is greater than a second value, the operation resultant value is X, otherwise the operation resultant value is Y,
 if the first value is greater than or equal the second value, the operation resultant value is X, otherwise the operation resultant value is Y,
 if the first value is equal to the second value, the operation resultant value is X, otherwise the operation resultant value is Y, or
 if the first value is not equal to the second value, the operation resultant value is X, otherwise the operation resultant value is Y,
 the first value selected from the texture graphics data and the second value being an integer between 0 and 255.

29. The graphics processing system of claim 24 wherein the third functional operations performed by the post-combine circuit on the operation resultant value to produce the post-combine output value comprises a fifth function and a sixth function performing an operation on the resultant of the fifth function, the fifth function is:
 the operation resultant value is unchanged, or
 128 is subtracted from the operation resultant value; and
 the sixth function is:
 the resultant of the fifth function is unchanged,
 the resultant of the fifth function is shifted left 1 bit,
 the resultant of the fifth function is shifted left 2 bits,
 the resultant of the fifth function is shifted right 1 bit,
 color components of the fifth function are summed and replicated into the color components,
 the color components and alpha of the fifth function are summed and replicated into the color components, or
 the color components and alpha value of the fifth function are summed and replicated into the color components and alpha value.

30. A computer system, comprising:
 a system processor;
 a system bus coupled to the system processor;
 a system memory coupled to the system bus; and
 a graphics processing system coupled to the system bus, the graphics processing system, comprising:
  a bus interface for coupling to a system bus;
  a graphics processor coupled to the bus interface to process graphics data;
  address and data busses coupled to the graphics processor to transfer address and graphics data to and from the graphics processor;
  display logic coupled to the data bus to drive a display;
  a texture interpolation circuit coupled to the address and data busses and having output terminals to provide a plurality of texture graphics data for a pixel; and
  a texture combine circuit coupled to the graphics processor and the texture interpolation circuit to generate fragment graphics data for the pixel from the plurality of texture graphics data, the texture combine circuit comprising:
   a first texture combine unit coupled to the output terminals of the texture interpolation circuit to perform graphics combine operations on input data selected from the plurality of texture graphics data for the pixel to produce first combined graphics data at first texture combine unit output terminals; and
   a second texture combine unit coupled to the output terminals of the texture interpolation circuit to receive the plurality of texture graphics data for the pixel and further coupled to the first texture combine unit output terminals to receive the first combined graphics data, the second texture combine unit performing graphics combine operations on the input data selected from the plurality of texture graphics data for the pixel and the first combined graphics data to produce second combined graphics data at second texture combine unit output terminals; and a third texture combine unit coupled to the texture interpolation circuit to receive the plurality of texture graphics data for the pixel and further coupled to the first and second output terminals to perform third graphics combine operations on a third group of data selected from the graphics data from the plurality of textures for the pixel, the first and the second resultant graphics values and provide third resultant graphics values resulting from the third graphics combine operations at third output terminals.

31. The computer system of claim 30 wherein the texture graphics data and the fragment graphics data for the pixel comprise color values and alpha values.

32. The computer system of claim 30, further comprising a graphics lighting unit coupled to the address and data busses and the at least one texture combine unit to provide lighting graphics data for use in the graphics combine operations, the input data selected by the texture combine unit is selected from the plurality of texture graphics data and the lighting graphics data.

33. The computer system of claim 30 wherein the graphics combine operations performed by the texture combine unit are user programmable.

34. The computer system of claim 30 wherein the texture combine unit comprises:

a pre-combine circuit to perform first functional operations on the input data and a post pre-combine function on the resultant thereof and produce pre-combine resultant values at pre-combine output terminals;

an operation circuit coupled to the pre-combine output terminals to perform a second functional operation on the pre-combine resultant values and produce an operation resultant value at an operation output terminal; and a post-combine circuit coupled to the operation output terminal to perform a third functional operation on the operation resultant value and produce a post-combine output value at a post-combine output terminal.

35. The computer system of claim 34, further comprising a clamping circuit coupled to the post-combine output terminal to clamp the post-combine output value to a texture combine output value.

36. The computer system of claim 34 wherein the first functional operations performed by the pre-combine circuit on the input data are:

the input data is unchanged, the input data is inverted, or the input data converted from a range of 0 to 255 to a range of −255 to +255 by multiplying the input data by two and subtracting 255.

37. The computer system of claim 34 wherein the resultant values of the first functional operations comprise first, second, third, and fourth values and the pre-combine function performed by the pre-combine circuit to produce the pre-combine resultant values comprises:

first value×second value; and third value+fourth value.

38. The computer system of claim 34 wherein the pre-combine resultant values comprise first and second pre-combine resultant values, X and Y, respectively, and the second functional operation performed by the operation circuit on the pre-combine resultant values to produce the operation resultant value is:

the sum of X and Y, the difference between X and Y,

X OR Y,

X AND Y,

X XOR Y, determine the minimum of X and Y, determine the maximum of X and Y, if a first value is greater than a second value, the operation resultant value is X, otherwise the operation resultant value is Y, if the first value is greater than or equal the second value, the operation resultant value is X, otherwise the operation resultant value is Y, if the first value is equal to the second value, the operation resultant value is X, otherwise the operation resultant value is Y, or if the first value is not equal to the second value, the operation resultant value is X, otherwise the operation resultant value is Y, the first value selected from the texture graphics data and the second value being an integer between 0 and 255.

39. The computer system of claim 34 wherein the third functional operations performed by the post-combine circuit on the operation resultant value to produce the post-combine output value comprises a fifth function and a sixth function performing an operation on the resultant of the fifth function, the fifth function is:

the operation resultant value is unchanged, or 128 is subtracted from the operation resultant value; and the sixth function is:

the resultant of the fifth function is unchanged, the resultant of the fifth function is shifted left 1 bit, the resultant of the fifth function is shifted left 2 bits, the resultant of the fifth function is shifted right 1 bit, color components of the fifth function are summed and replicated into the color components, the color components and alpha of the fifth function are summed and replicated into the color components, or the color components and alpha value of the fifth function are summed and replicated into the color components and alpha value.

40. A method for combining graphics data of a plurality of textures for a pixel, comprising:

selecting a first data set from the graphics data of the plurality of textures for only the pixel;

performing first graphics combine operations on the data set to produce first resultant graphics data;

selecting a second data set from the graphics data of the plurality of textures for the pixel and the first resultant graphics data;

performing second graphics combine operations on the second data set to produce second resultant graphics data;

selecting a third data set from the graphics data of the plurality of textures for the pixel, the first resultant graphics data, and the second resultant graphics data; and performing third graphics combine operations on the third data set to produce third resultant graphics data.

41. The method of claim 40 wherein performing the graphics combine operations comprises programming the graphics combine operations and executing the operations.

42. The method of claim 41 wherein the programming the graphics combine operation comprises:

selecting pre-combine functions to be performed on the data set;

selecting a operation function to be performed on the resultants of the pre-combine functions; and selecting a post-combine function to be performed on the resultant of the operation function.

43. The method of claim 42, further comprising clamping the resultant value of the post-combine function.

44. The method of claim 42 wherein the pre-combine function is:

the data is unchanged, the data is inverted, or the data is converted from a range of 0 to 255 to a range of −255 to +255 by multiplying the data by two and subtracting 255.

45. The method of claim 42 wherein the resultants of the pre-operation functions are X and Y and the operation function is:

the sum of X and Y, the difference between X and Y,

X OR Y,

X AND Y,

X XOR Y, determine the minimum of X and Y, determine the maximum of X and Y, if a first value is greater than a second value, the operation resultant value is X, otherwise the operation resultant value is Y, if the first value is greater than or equal the second value, the operation resultant value is X, otherwise the operation resultant value is Y, if the first value is equal to the second value, the operation resultant value is X, otherwise the operation resultant value is Y, or if the first value is not equal to the second value, the operation resultant value is X, otherwise the operation resultant value is Y, the first value selected from the texture graphics data and the second value being an integer between 0 and 255.

46. The method of claim 42 wherein the post-combine function comprises a primary function performed on the operation resultant value and a secondary function performed on the resultant of the primary function.

47. The method of claim 46 wherein the primary function is:

the operation resultant value is unchanged, or 128 is subtracted from the operation resultant value.

48. The method of claim 46 wherein the secondary function is:

the resultant of the primary function is unchanged, the resultant of the primary function is shifted left 1 bit, the resultant of the primary function is shifted left 2 bits, the resultant of the primary function is shifted right 1 bit, color components of the resultant of the primary function are summed and replicated into the color components, the color components and alpha of the resultant of the primary function are summed and replicated into the color components, or the color components and alpha value of the resultant of the primary function are summed and replicated into the color components and alpha value.

49. The method of claim 40, further comprising selecting for the data set from lighting graphics data.

50. The method of claim 40, further comprising:

selecting a new data set from the resultant graphics value and the graphics data of the plurality of textures;

performing graphics combine operations on the new data set to produce a new resultant value; and repeating the selecting and performing.

51. The method of claim 40 wherein selecting a data set comprises selecting four values from the plurality of textures.

52. The method of claim 40 wherein the graphics data of the plurality of textures comprises a color value and an alpha value.

53. The method of claim 52 wherein the color value comprises red, green, and blue color components.

54. The apparatus of claim 12, further comprising a fourth texture combine unit coupled to receive the graphics data from the plurality of textures and further coupled to the first, second, and third output terminals to perform fourth graphics combine operations on a fourth group of data selected from the graphics data from the plurality of textures, the first, second, and third resultant graphics values and provide fragment graphics values resulting from the fourth graphics combine operations at fourth output terminals.

* * * * *

UNITED STATES PATENT AND TRADEMARK OFFICE
CERTIFICATE OF CORRECTION

PATENT NO. : 6,784,895 B1
DATED : August 31, 2004
INVENTOR(S) : Aaftab Munshi

It is certified that error appears in the above-identified patent and that said Letters Patent is hereby corrected as shown below:

Column 2,
Line 30, reads "directed toward a texture" should read -- directed towards a texture --
Line 38, reads "circuit perform graphics combine" should read -- circuit performs graphics combine --

Column 7,
Line 30, reads "(condTerm,  = = condValue) ? X : Y" should read -- (condTerm, = = condValue) ? X : Y --

Column 8,
Line 4, reads "sumall, similar to sum" should read -- sumAll, similar to sum --
Line 6, reads "similar to sumall but result" should read -- similar to sumAll but result --
Line 64, reads "perform graphics combine" should read -- performs graphics combine --

Column 10,
Line 48, reads "the color components, the" should read -- the color components, --

Column 17,
Line 1, reads "selecting a operation" should read -- selecting an operation --

Signed and Sealed this

Twenty-first Day of June, 2005

JON W. DUDAS
*Director of the United States Patent and Trademark Office*